United States Patent [19]
Hafele

[11] Patent Number: 5,929,327
[45] Date of Patent: Jul. 27, 1999

[54] CATALYTIC CONVERTER

[75] Inventor: Edelbert Hafele, Karlsruhe, Germany

[73] Assignee: Heraeus-Electro-Nite International NV, Houthalen, Belgium

[21] Appl. No.: 08/860,087

[22] PCT Filed: Nov. 11, 1996

[86] PCT No.: PCT/EP96/04930

§ 371 Date: Jul. 2, 1997

§ 102(e) Date: Jul. 2, 1997

[87] PCT Pub. No.: WO97/17534

PCT Pub. Date: May 15, 1997

[30] Foreign Application Priority Data

Nov. 10, 1995 [DE] Germany ............................ 195 42 038

[51] Int. Cl.[6] .............................. B01J 35/02; B01J 37/02; B01D 53/86; B01D 53/94

[52] U.S. Cl. ............................................................ 73/118.1

[58] Field of Search ............................... 73/23.31, 23.32, 73/118.1; 60/276, 277

[56] References Cited

U.S. PATENT DOCUMENTS 4,328,780   5/1982   Andrew ................................... 73/23.31
4,351,182   9/1982   Schmidberger ......................... 73/23.31

*Primary Examiner*—George Dombroske
*Attorney, Agent, or Firm*—Antonelli, Terry, Stout & Kraus, LLP

[57] ABSTRACT

The invention relates to catalytic converters to be placed in the flowing exhaust of exhaust gas installations, preferably internal combustion engines, with a carrier material provided with a catalyst-containing ceramic coating and at least one temperature sensor applied in thick film technique, which is characterized in that the temperature sensor is located on the surface of the carrier material and that the catalyst-containing ceramic coating covers the temperature sensor.

8 Claims, 1 Drawing Sheet

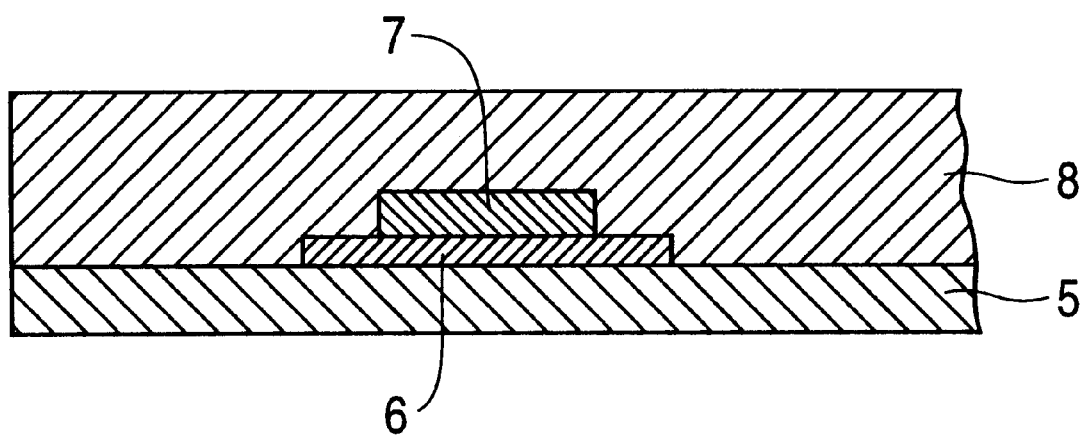

CATALYTIC CONVERTER

BACKGROUND OF THE INVENTION

The invention relates to a catalytic converter to be placed in the flowing exhaust of exhaust gas installations, preferably internal combustion engines, with a carrier material provided with a catalyst-containing ceramic coating and at least one temperature sensor applied in a thick film technique.

This catalytic converter in which a coating of catalyst-containing material (wash coat) with an overlying temperature sensor applied in thick film technique is applied to the carrier material is known (EP-0 589 169 A1).

These known catalytic converters have proven essentially effective. However their service life is limited at high operating temperatures.

SUMMARY OF THE INVENTION

Therefore the object of the invention is to devise a generic catalytic converter operable at higher operating temperatures with a longer service life, in which the service lives of especially sensitive temperature sensor or catalyst materials are improved.

This object is achieved in a catalytic converter by locating the temperature sensor on the surface of the carrier material and providing a catalyst-containing ceramic coating covering the temperature sensor.

In the catalytic converter according to the invention it has been surprisingly found that when the temperature sensor is placed under the overlying catalyst coating, on the one hand, higher operating temperatures can be tolerated, on the other hand, at these higher temperatures longer service lives, especially of the temperature sensor components, can be expected. When a metallic carrier material is used, the temperature sensor is located on an electrical insulator. When a nonconductive carrier material is used, for example a monolith, this is unnecessary.

According to one special feature of the invention, the insulator has a borosilicate enamel and is produced at temperatures from 960 to 1250° C., the temperature sensor impressed on the insulator in thick film technique, being annealed at a temperature which is the same or lower than the annealing temperature of the insulator, and that a catalyst layer is applied to the temperature sensor in thick film technique and is annealed at an annealing temperature which is the same as or lower than the annealing temperature of the temperature sensor.

The catalytic converters according to the invention, besides improved service lives, have the advantage that the temperature signals delivered by the temperature sensor reproduce the temperature of the catalyst-containing ceramic; coating without being influenced by the gases flowing around the catalyst.

BRIEF DESCRIPTION OF THE DRAWINGS

One preferred embodiment which shows a catalytic converter according to the invention with a metallic carrier material in the form of a sheet of high quality steel foil in a schematic cross section is shown in the drawing.

DETAILED DESCRIPTION OF THE PREFERRED EMBODIMENTS

Electrically insulating insulator layer 6 which has borosilicate enamel is applied, preferably by printing, to a metallic carrier material which is labelled 5 throughout. Known temperature sensor 7 is impressed on this insulator layer in thick film technique.

According to alternative embodiments, two temperature sensors can be provided in the flow direction of the exhaust gas, one at the input and one at the output of the catalytic converter, optionally on the insulator layer, or both at the output. In the latter case, one can be covered with a gas-impermeable layer and one with a gas permeable porous protective layer.

Carrier material 5 and insulator 6 as well as temperature sensor 7 are coated by catalyst-containing ceramic coating 8 which is applied for example by immersion.

Here, first of all, insulator layer 6 is annealed onto the surface of carrier material 5 by pressing and subsequent annealing at roughly 960 to 1250° C. Afterwards, following completed cooling, actual platinum-containing temperature sensor 7 is impressed on insulator 6 in thick film technique and is likewise annealed at a temperature between 960 and 1250° C. or a lower temperature. Afterwards, all the carrier material in the form of the sheet or sheets is provided by immersion with the coating which has the catalyst-containing ceramic material and is annealed at a temperature which is the same as or lower than the annealing temperature of the temperature sensor.

A borosilicate enamel which is suited for the insulator layer 6 can for example have the following composition:

57.5% by weight $SiO_2$
21.1% by weight $Al_2O_3$
6.9% by weight $B_2O_3$
4.6% by weight $ZrO_2$
5.6% by weight $TiO_2$
2.6% by weight CaO
1.8% by weight MgO Application can be done in the form of a silk-screen paste based on terpineol by silk screening onto the metal substrate 5. The layer can be dried for example for 10 minutes at 120° C. and then fired for two hours at 1120° C.

After cooling, a temperature sensor 7 can be applied with a silk-screen paste with the following composition by silk screening:

65% solid portion consists of 90% platinum powder and 10% borosilicate enamel of the aforementioned composition 35% of an organic silk screen paste parent chemical based on terpineol.

The print can be dried for example for 10 minutes at 120° C. and then fired for ½ hour at 1080° C.

Then a platinum-containing catalyst 8 in the form of a catalyst- containing ceramic coating which in this case consists of two layers can be applied over the temperature sensor 7 and on the carrier material 5. To do this the procedure is as follows:

240 cm³ water and 1 cm³ nitric acid are mixed with 100 g of y-aluminum oxide and boehmite, yielding an aluminum oxide slurry. The carrier 5 provided with the insulator layer 6 and temperature sensor 7 is immersed in the slurry. After immersion, excess aluminum oxide slurry is removed and the carrier material covered with the aluminum oxide slurry is fired first for 1 hour at 130° C. and afterwards for 1.5 h at 550° C.

The fired material is impregnated with a precious metal-containing solution consisting of

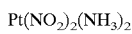

and rhodium nitride or with a ruthenium solution (for oxidation catalysts). The impregnated product is fired for 1 hour at 200° C. and then for 2 hours at 600° C.

The ratio of Pt and Rh can be 5:1 at a precious metal concentration of roughly 1.6 g per liter. Then, to apply a second layer of the catalyst- containing ceramic coating 8, 1250 ml of a 0.3 molar zirconyl octahydrate solution is mixed with 1000 ml of a 0.25 molar lanthanum nitrate hexahydrate solution with 120 g cerium oxide ($CeO_2$) and 50 g boehmite. The resulting mixture is dried so that Zr and Ce are fixed on the surface of the solids. The resulting product is ground. Then 240 $cm^3$ water and 1 $cm^3$ nitric acid are added to the product, a slurry-like substance being formed.

The substrate covered with the first layer is immersed in the slurry and after it is taken out the excess slurry is removed. Then firing is done for 1 hour at 130° C. and afterwards 1.5 h at 550° C.

The resulting product is immersed in a 0.1% palladium tetraamine solution so that palladium is introduced into the second layer in a proportion of 1 g/l. The resulting product is fired for 1 h at 130° C. and afterwards for 1.5 h at 550° C.

I claim:

1. A catalytic converter to be placed in the flowing exhaust of exhaust gas installation comprising a carrier material at least one temperature sensor applied in thick film technique over the surface of carrier material, and a catalyst-containing ceramic coating covering the at least one temperature sensor.

2. Catalytic converter according to claim 1, wherein carrier material is metallic and an electrically insulating insulator layer is applied between the carrier material and the temperature sensor.

3. Catalytic converter according to claim 1, wherein there are two temperature sensors in the flow direction of the exhaust gas each at the input and output of the catalytic converter.

4. Catalytic converter according to claim 1, wherein there are two temperature sensors with respect to the flow direction of the exhaust at the catalytic converter output.

5. Catalytic converter according to claim 4, wherein one of the temperature sensors is covered with a gas-impermeable layer and the other of the temperature sensors is covered with a gas-permeable porous protective layer.

6. Catalytic converter according to claim 1 wherein the temperature sensor contains platinum.

7. Process for producing a catalytic converter comprising a carrier material and a catalyst-containing ceramic coating and, at least one temperature sensor over a surface of the carrier material, wherein the temperature sensor is applied to the carrier material in thick film technique and is annealed at a temperature which is the same or lower than the annealing temperature of the insulator, and a catalyst-containing ceramic coating provided over the temperature sensor, wherein the catalyst-containing ceramic coating is applied to the temperature sensor in thick film technique and is annealed at an annealing temperature which is the same as or lower than the annealing temperature of the temperature sensor.

8. Process according to claim 7, wherein before applying the temperature sensor to a metallic carrier material, an electrical insulator is applied which has a borosilicate enamel and which is annealed at a temperature of 960 to 1250° C.

* * * * *